June 19, 1945.  M. S. HARRIS  2,378,847
AGRICULTURAL VEHICLE
Filed April 21, 1944   5 Sheets-Sheet 1
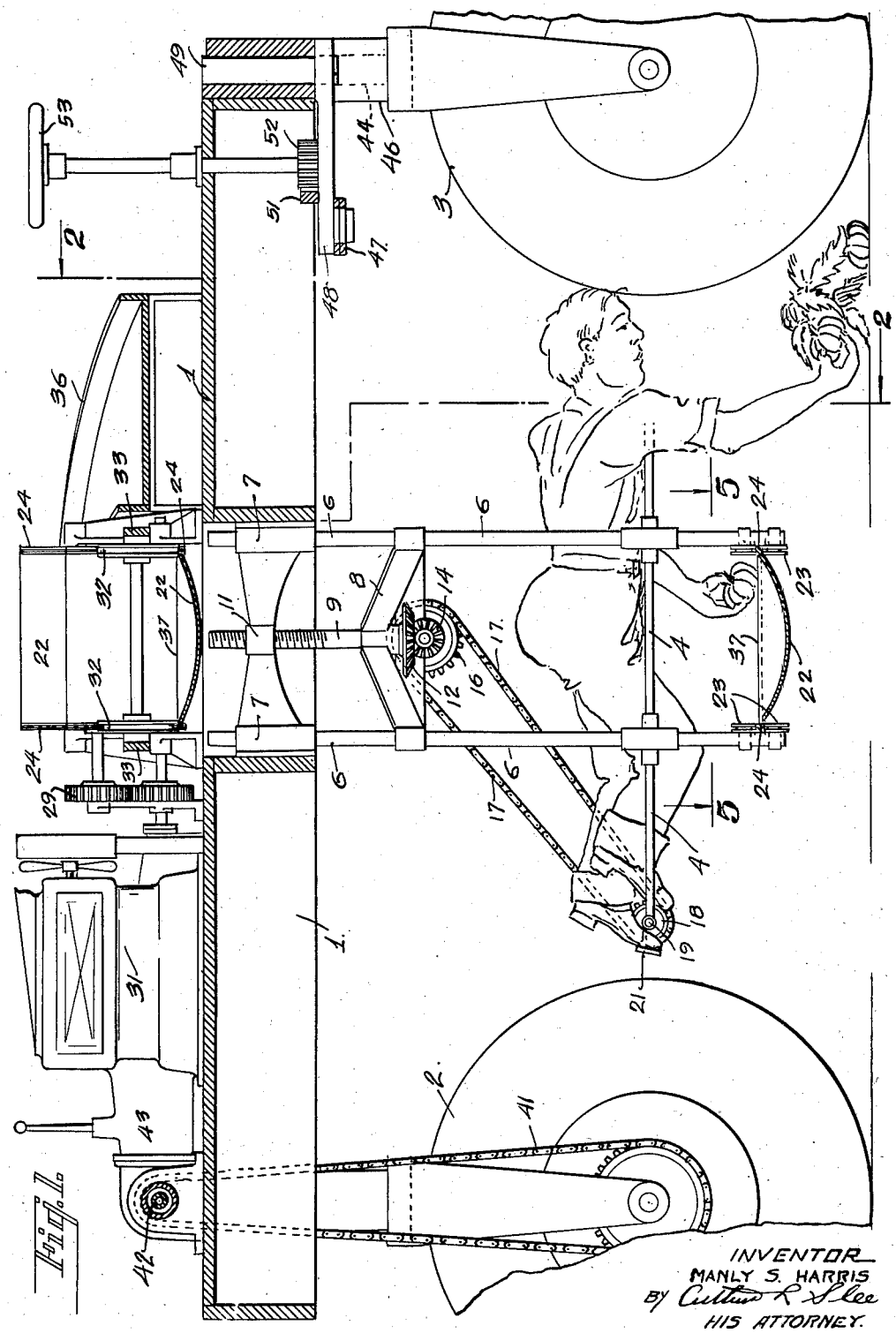
INVENTOR
MANLY S. HARRIS
BY Cutter R. Lee
HIS ATTORNEY.

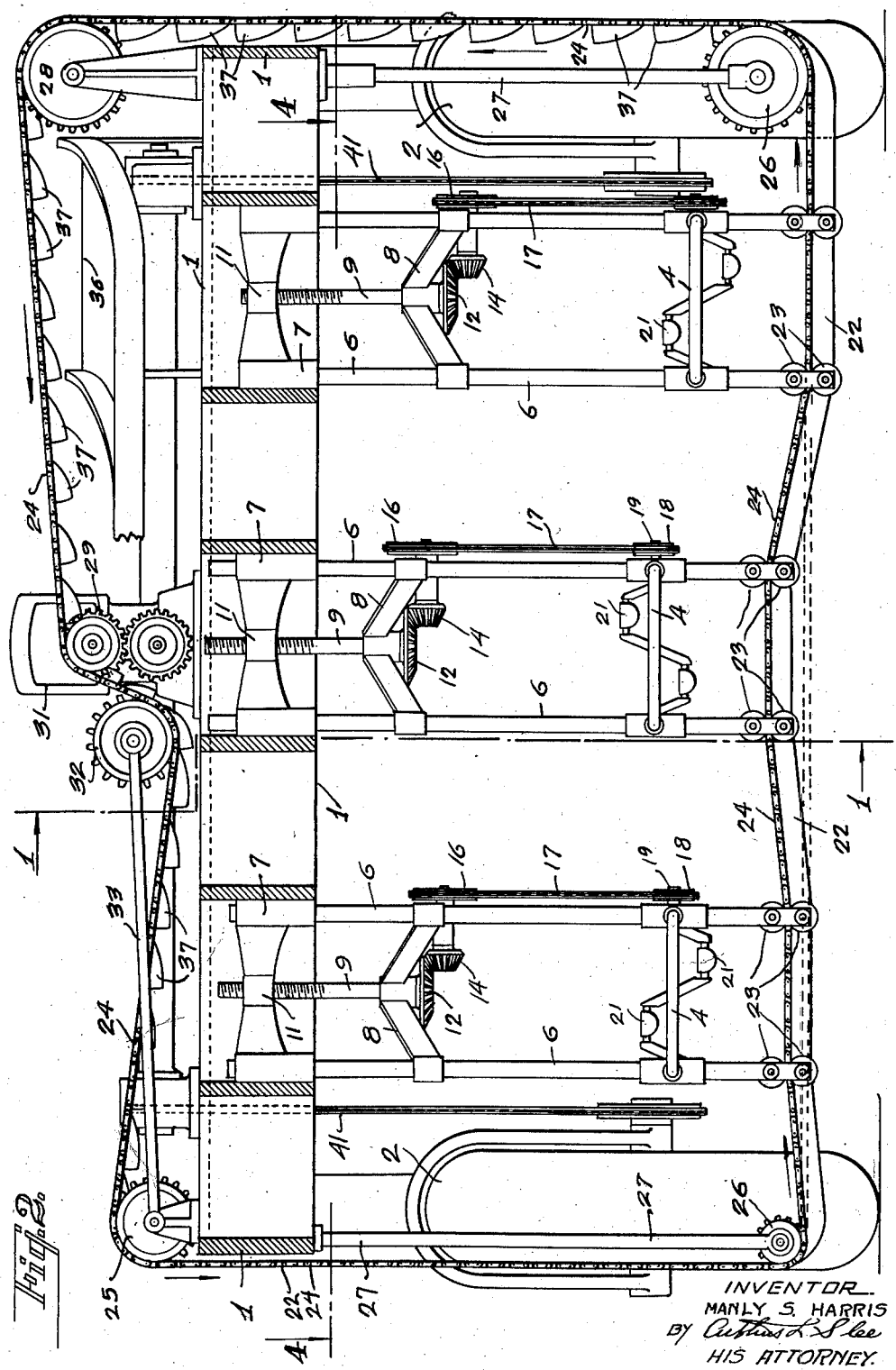

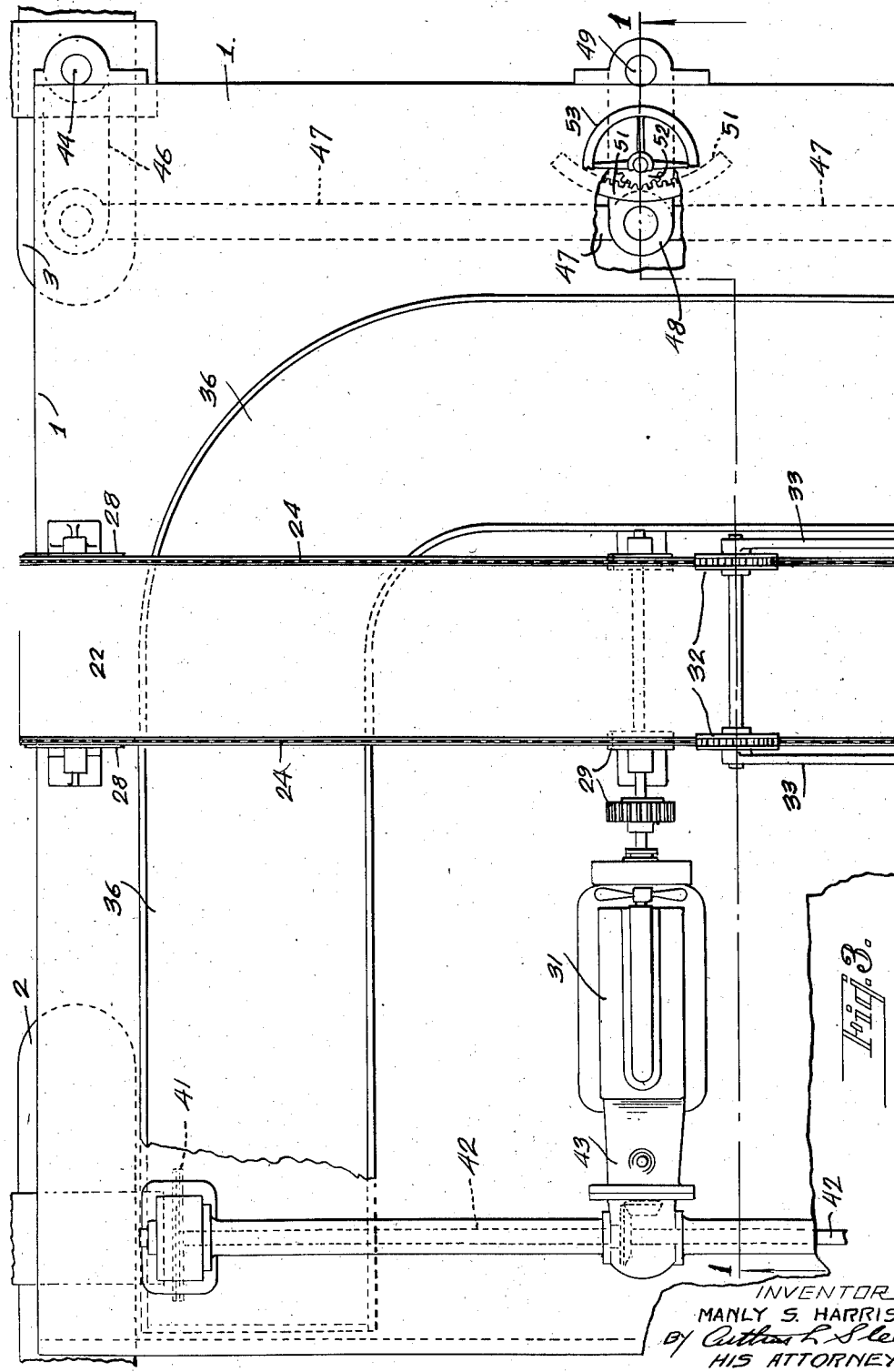

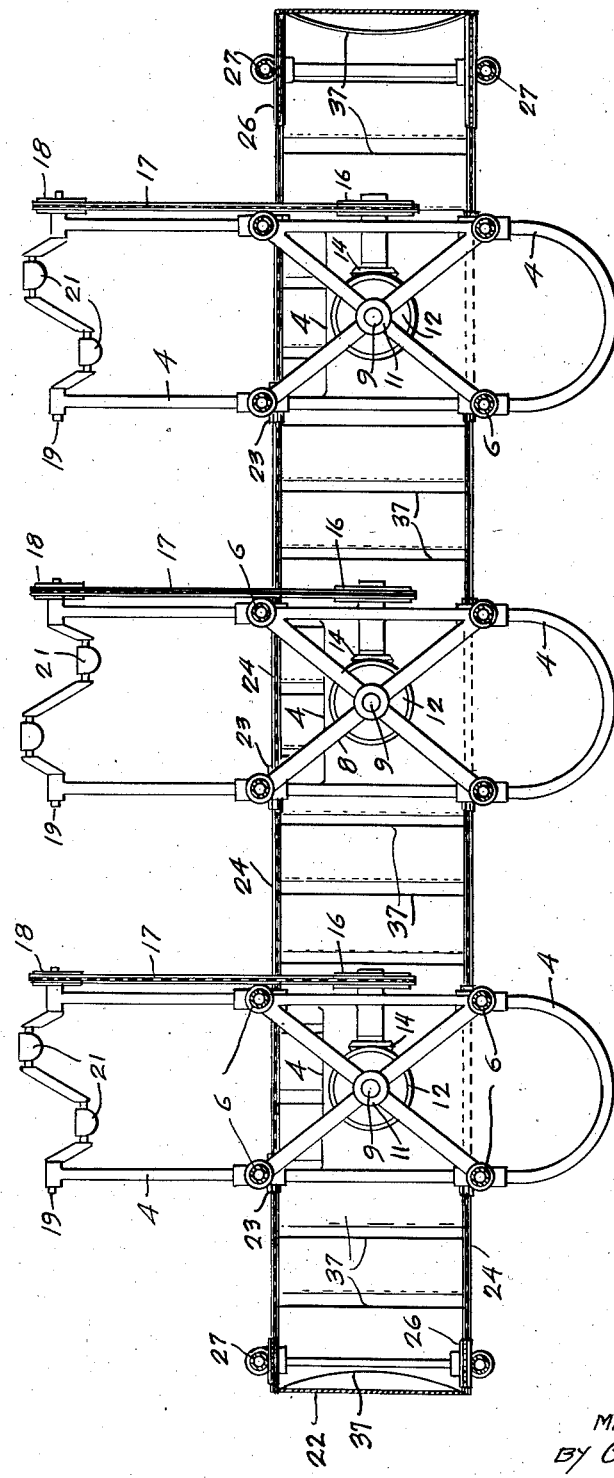

June 19, 1945.   M. S. HARRIS   2,378,847
AGRICULTURAL VEHICLE
Filed April 21, 1944   5 Sheets-Sheet 5
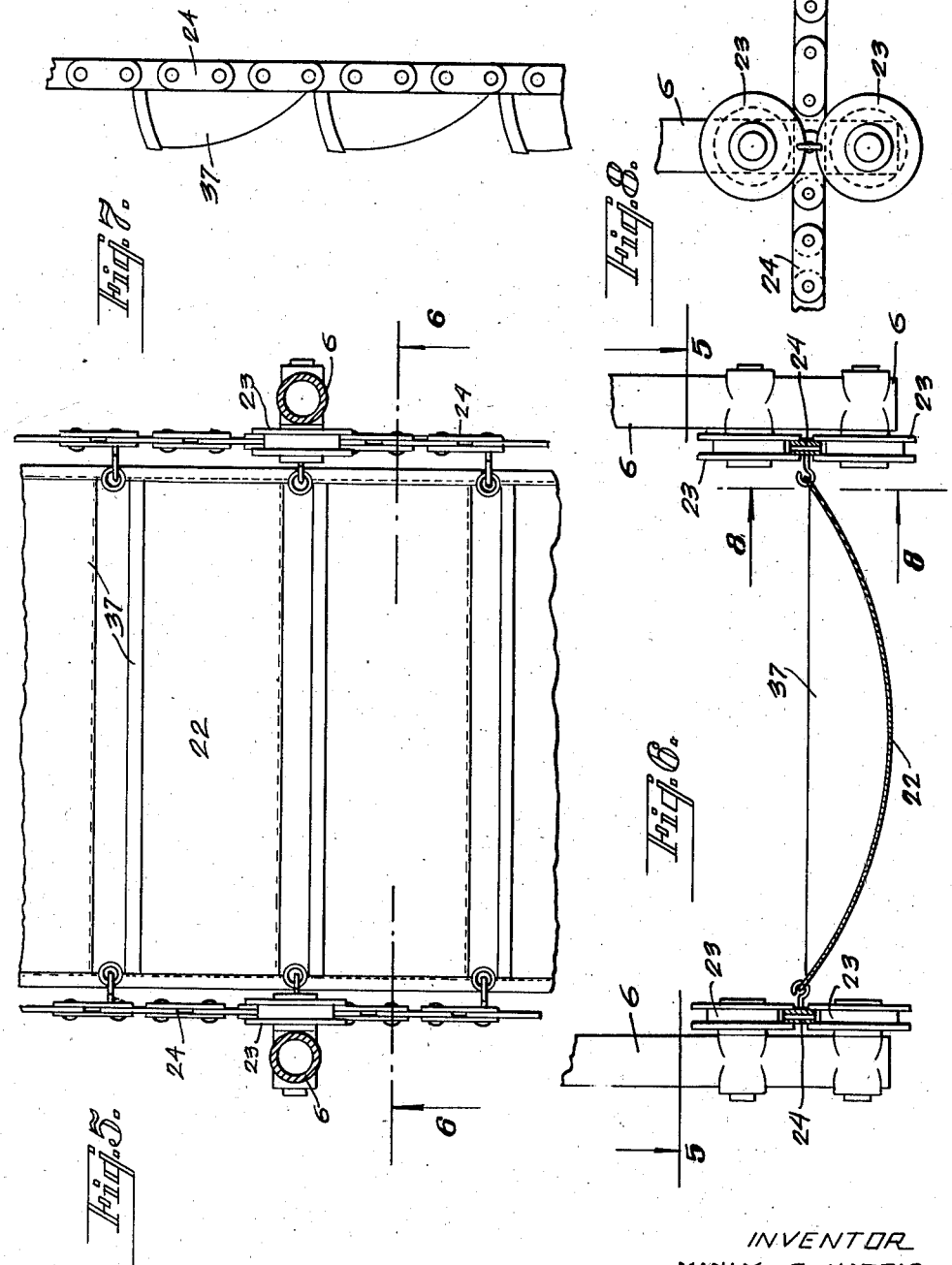
INVENTOR
MANLY S. HARRIS.
BY Arthur L. Slee
HIS ATTORNEY.

Patented June 19, 1945

2,378,847

UNITED STATES PATENT OFFICE 2,378,847

AGRICULTURAL VEHICLE

Manly S. Harris, San Francisco, Calif.

Application April 21, 1944, Serial No. 532,151

9 Claims. (Cl. 214—83)

This invention relates to improvements in a gang harvester wherein a plurality of cradles, adjustably suspended below a tractable frame supported in spaced relation above an area being harvested, operate in conjunction with improved means independently actuated or operable from each separate cradle for adjusting the same, and that portion of a receiving conveyor directly beneath, relatively to a crop being harvested, to facilitate harvesting and to increase the efficiency and convenience of the harvesting operation.

The primary object of the present invention is to provide new and improved means for comfortably and conveniently conveying a gang of harvesters over an area to be harvested and having more convenient and efficient means for receiving a crop and conveying the same from the immediate area.

Another object is to provide a new and improved device of the character set forth having improved means actuated by each harvester for independently adjusting his own support relatively to a crop being harvested.

A further object is to provide a new and improved gang harvester of the type described having improved means independently operable by each worker for raising and lowering or adjusting that portion of a common receiving conveyor directly below him, to facilitate depositing of a crop within said conveyor.

A still further object is to provide a new and improved device as described in which the comfort and convenience of the harvesters are greatly improved in order to increase efficiency and facilitate a harvesting operation.

I accomplish these and other objects by means of the improved device disclosed in the drawings forming a part of the present application, and in which—

Fig. 1 is a partly broken sectional view of the device, taken on lines 1—1 of Figs. 2 and 3 of the drawings, in the directions indicated;

Fig. 2 is a sectional view taken on line 2—2 of Fig. 1 of the drawings, in the direction indicated;

Fig. 3 is a partly broken plan view of a greater portion of the harvester;

Fig. 4 is a sectional view taken on line 4—4 of Fig. 2 of the drawings, in the direction indicated;

Fig. 5 is a broken sectional view taken on line 5—5 of Fig. 6 of the drawings, in the direction indicated;

Fig. 6 is a transverse section of the common conveyor, taken on line 6—6 of Fig. 5, in the direction indicated;

Fig. 7 is a broken side elevation of the rising portion of the common conveyor; and Fig. 8 is a section taken on line 8—8 of Fig. 6, in the direction indicated.

Referring to the drawings:

The numeral 1 is used to designate in general a platform or frame supported in spaced relation above the ground by rear driving wheels 2 and front steering wheels 3, said wheels 2 and 3 being driven and steered, respectively, by suitable means hereinafter more fully set forth.

A plurality of supporting cradles 4, preferably open at the back portions thereof to permit a pedalling motion of the legs of an occupant or harvester, are adjustably suspended below the frame 1 by means of pairs of upright bars 6 slidably mounted within suitable bearings 7 secured to the frame 1, each set of bearings 7 carrying a member or connecting frame having a central nut 11 engaged by a threaded stem 9 rotatably mounted within a frame or spider 8 which is rigidly connected to each set of bars or rods 6 for each cradle 4.

For each cradle 4 there is a set of bars 6, spider 8, threaded stem 9 and nut 11, as well as bearings 7 therefor.

Each spider 8, and bars 6 connected thereto, is suspended from its respective stem 9 rotatably mounted therein, and each stem 9 has a bevel gear 12 rigidly secured to the lower end thereof meshing with a gear 14 connected to a sprocket 16 engaged by a suitable chain 17 also engaging another sprocket 18 upon the pedal shaft 19 rotatably mounted upon the rear end of each cradle 4 and provided with suitable treadles 21, the purpose of which will hereinafter be more fully set forth.

A flexible endless conveyor 22 is suitably strung between chains 24 which passes transversely of the frame 1, above and below the same, and transversely under the cradles 4 being held in spaced relation below each individual cradle 4 by means of grooved pulleys 23 mounted upon the lower ends of the bars 6, as fully disclosed in detail in Figs. 1, 2, 6 and 8 of the drawings. The lower portion of the common conveyor 22 passes over idlers 26 at each lower end of stanchions 27 depending from the frame 1, over idlers 28 and 25 on opposite sides of the top of said frame 1, and also over driving gears 29 connected to a suitable motor 31 on top of said frame 1.

A gravity actuated compensator or take-up consists of a pair of sprockets 32 rotatably mounted upon the free ends of bars 33 in turn pivotally mounted upon one side of the top of frame 1 and resting upon the chains 24 of the conveyor 22, preferably between the driving gears 29 and the idler 25, as fully disclosed in Fig. 2 of the drawings. The weight of the sprockets 32 automatically takes up any slack in the common conveyor 22.

A receiving chute 36 is mounted below the conveyor 22 between the idler 28 at one side of the frame 1, and the driving gears 29 in the approximate center of said frame 1.

The inner face of the common endless conveyor 22 is provided with a series of pockets 37, so that said pockets are uppermost on the lower portion of the conveyor 22 below the frame 1, and lowermost on the upper portion of said conveyor 22 above the frame 1, the purpose of which will hereinafter be more fully described.

The rear or driving wheels 2 are connected by suitable chains 41 to a shaft 42 in turn driven and controlled by a suitable transmission 43 of the motor 31. The front wheels are pivotally mounted for steering purposes upon the front of the frame 1 as at 44, each front wheel 3 being provided with a lever 46 connected by reach rods 47 to a lever 48 pivotally mounted upon the front central portion of said frame 1 as at 49, said lever 48 being provided with a geared sector 51 meshing with a pinion 52 operatively connected to and actuated by the usual steering wheel 53.

In operation:

In order to provide sufficient time for workers on the cradles to gather the harvest completely without undue fatigue, the vehicle travels at the rate of approximately 10 to 12 miles per hour.

Each worker lies comfortably prone upon his cradle 4 with his feet engaging the treadles or pedals 21 at the rear thereof, and with the front end of said cradle 4 below his chest and a sufficient distance back of the armpits to permit a perfectly free movement of both arms, as illustrated in Fig. 1 of the drawings. As the vehicle proceeds, the common endless conveyor 22, driven by the gears 29 of the motor 31, traverses its course transversely beneath the cradles 4 and workers thereon. As a worker gathers his crop from the ground below and slightly in front of him, with convenient and natural movements backwards with his hands and arms, operating alternately or simultaneously, he deposits said crop on the moving conveyor 22 below and slightly back of his waist conveniently and comfortably and efficiently, without producing undue fatigue.

If, for any reason, a harvester should find it essential or desirable to readjust his position relatively to the area or crop being harvested, such readjustment easily may be accomplished independently of the other workers or cradles, by manipulating the treadles or pedals 21 with his feet, the open rear portion of the cradle 4 permitting such pedaling motion, and either raise or lower his own cradle 4 and that portion of the common conveyor 22 directly beneath, which portion is at all times moved with said cradle by the grooved pulleys 23. This pedalling motion will rotate the shaft 19 in the required direction, the sprocket 18, chain 17, sprocket 16, bevel gears 14 and 12, and the threaded stem 9 operating through the threaded nut 11 and supporting the spider 8 and cradle 4 suspended therefrom by the rods 6. Thus any worker may easily and practically adjust his cradle and himself, up or down, to a more comfortable and efficient position without interrupting the crop-gathering labor of his hands, and at the same time automatically move his immediate portion of the common carrier within easy and convenient distance of his depositing hands. Fig. 2 of the drawings clearly illustrates that the several cradles 4 may be adjusted to different positions relatively to each other and to the normal path of the lower portion of the conveyor 22 indicated in dotted lines. Any deviation, or deviations from the normal course of the lower portion of said conveyor 22 is automatically compensated for by the attraction of gravity on the compensator comprising the sprockets 32, as hereinbefore described.

The common conveyor 22 receives the combined harvests from all occupants or harvesters of all cradles 4 and, moving transversely, conveys the same under the idler 26, upward and over the idler 28 and over the receiving chute 36 where, the pockets 37 being reversed the harvested crop is delivered from the said pockets 37 onto the receiving chute 36 by gravity, and by said chute 36 to workers, not shown, on top of the frame 1 for further disposition.

It is obvious from the foregoing that with the provision of improved and greatly simplified means whereby a harvester may be supported in a comfortable and convenient working position, with means provided for independently adjusting such position relatively to the ground, area or crop being harvested, that undue fatigue may be prevented and therefore a greater degree of efficiency obtained.

It should also be particularly noted that when a harvester readjusts his position, that his immediate portion of a common conveyor is also automatically adjusted within the same range, and a convenient depository is thus at all times efficiently maintained.

Having described my invention, I claim:

1. An agricultural vehicle comprising a frame; tractable and dirigible means for supporting said frame in spaced relation above the ground; cradles suspended below said frame; an endless conveyor mounted upon said frame and passing above and below the same and operatively connected below said cradles; and means for lowering and raising said cradles and those portions of said conveyor beneath them independently of each other.

2. An agricultural vehicle comprising a frame; tractable means for supporting said frame in spaced relation to the ground; cradles movably suspended from said frame for vertical movement; an endless conveyor mounted upon and passing above and below said frame and in engaging relation with and below said cradles; and independent means operatively connected to each cradle for adjusting said cradles and portions of said conveyor immediately below relatively to the ground.

3. An agricultural vehicle comprising a frame; tractable means for supporting said frame in spaced relation above the ground; a cradle movably suspended from said frame; an endless conveyor extending over and under said frame and under said cradle; means for movably connecting said conveyor to the under side of said cradle; and means operable from said cradle for moving the same and that portion of said conveyor connected thereto relatively to said frame.

4. An agricultural vehicle comprising a frame; wheels for supporting said frame in spaced relation above the ground; a plurality of cradles movably suspended from said frame; an endless conveyor passing over and under said frame and under said cradles; and means operatively connecting that portion of said conveyor under said frame to the under sides of said cradles.

5. An agricultural vehicle comprising a frame; wheels for supporting said frame in spaced relation above the ground; a plurality of cradles movably suspended from said frame; an endless conveyor passing over and under said frame and under said cradles; means operatively connecting the under portion of said conveyor to the under sides of said cradles; and independent means operatively connected to each cradle for independently raising and lowering the same and that portion of said conveyor connected thereto.

6. An agricultural vehicle comprising a frame; wheels mounted on said frame for supporting the same in spaced relation above the ground; a cradle suspended below said frame; an endless conveyor passing over and under said frame and under said cradle; pockets on the inner side of said conveyor; and means operatively connecting the under portion of said conveyor to the under side of said cradle.

7. An agricultural vehicle comprising a frame; wheels mounted on said frame for supporting the same in spaced relation to the ground; a cradle suspended below said frame; an endless conveyor passing over and under said frame and under said cradle; pockets on the inner side of said conveyor; means operatively connecting the under portion of said conveyor to the under side of said cradle; and means operable from said cradle for raising and lowering the same and that portion of the conveyor connected thereto relatively to said frame.

8. An agricultural vehicle comprising a frame; wheels mounted on said frame for supporting the same in spaced relation to the ground; a plurality of cradles movably suspended from said frame; an endless conveyor passing over and under said frame and under said cradles; a plurality of pockets on the inner surface of said conveyor; power means for operating said wheels and conveyor; and independent means for operatively connecting that portion of the under side of said conveyor immediately under each cradle to the under side thereof.

9. An agricultural vehicle comprising a frame; wheels mounted on said frame for supporting the same in spaced relation to the ground; a plurality of cradles movably suspended from said frame; an endless conveyor passing over and under said frame and under said cradles; a plurality of pockets along the entire inner side of said conveyor; power means for operating said wheels and conveyor; independent means for operatively connecting that portion of the under side of said conveyor immediately under each cradle to the under side thereof; and independent means mounted upon each cradle and operable therefrom for independently raising and lowering the same and that portion of said conveyor connected to the under side thereof.

MANLY S. HARRIS.